Aug. 31, 1943.   E. REANEY   2,328,493
METHOD OF SHAVE-MILLING STEEL
Filed April 25, 1942   2 Sheets-Sheet 1

INVENTOR
Ernest Reaney
BY Albert F. Nathan
ATTORNEY

Aug. 31, 1943.  E. REANEY  2,328,493
METHOD OF SHAVE-MILLING STEEL
Filed April 25, 1942  2 Sheets-Sheet 2
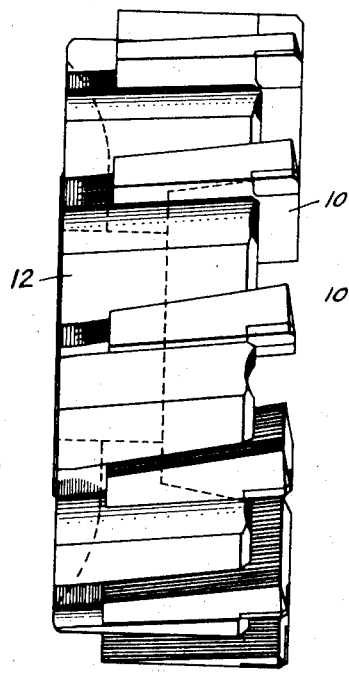
FIG.10.
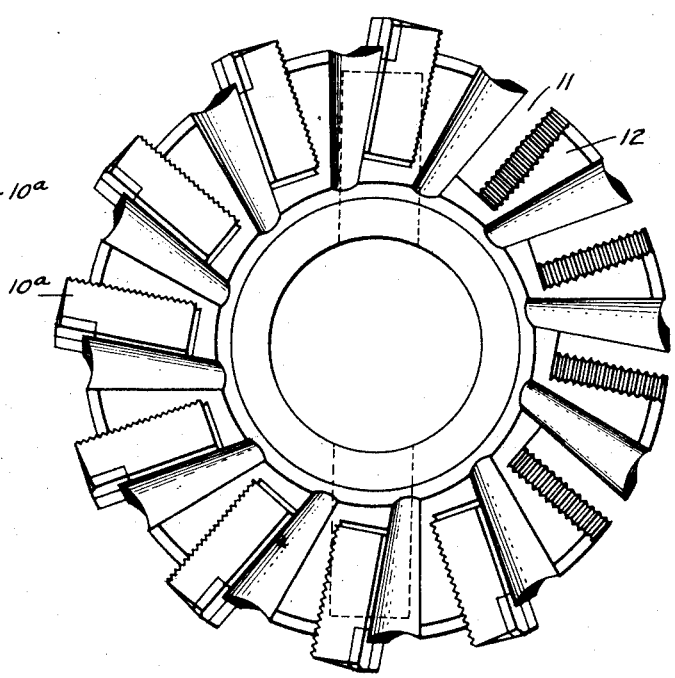
FIG.11.
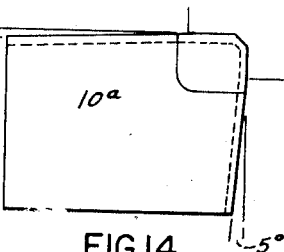
FIG.14.
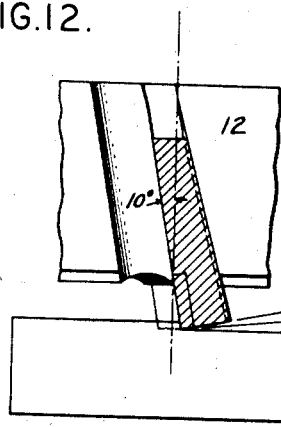
FIG.12.
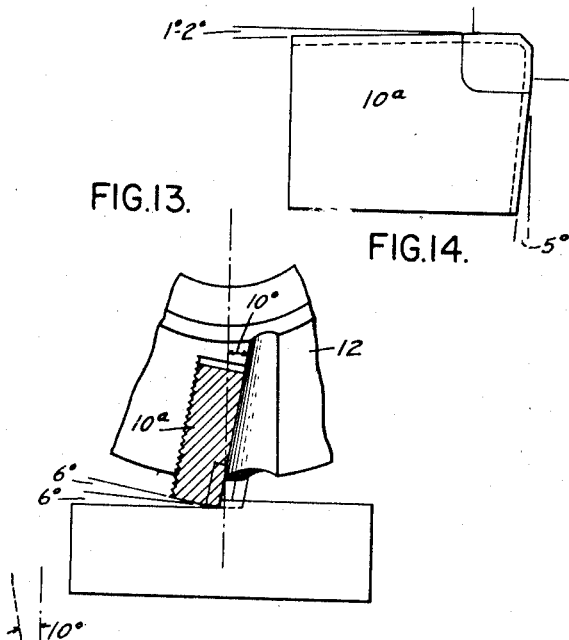
FIG.13.
FIG.15.
INVENTOR
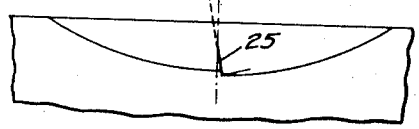
ATTORNEY Patented Aug. 31, 1943

2,328,493

UNITED STATES PATENT OFFICE 2,328,493

METHOD OF SHAVE-MILLING STEEL

Ernest Reaney, Stratford, Conn., assignor to The O. K. Tool Company, Inc., New York, N. Y., a corporation of New York Application April 25 1942, Serial No. 440,497

4 Claims. (Cl. 90—11)

This invention relates to an improvement in the art of machining metal and is concerned more particularly with a method of removing a layer of stock from a steel workpiece with a tungsten carbide cutting edge and simultaneously to produce on the steel a mirror-like finish.

Heretofore it has been impractical, if not impossible, to work on steel workpieces with a carbide tipped blade or tool, and this was especially true in such tooling operations wherein the cutting edge of the conventional cutter repeatedly enters and leaves the work. Rotary tools such as milling cutters and fly cutters are of the kind referred to, and when tipped with carbide were very short lived because of the inevitable break down of the carbide cutting edges when working on steel.

For this reason, the prior efforts to machine steel surfaces with carbide cutters in the manner practiced for cast iron and other metals, have not been accompanied with any degree of success and manufacturers have been obliged to continue with the slower method of machining steel with cutters made of high speed steel.

In endeavoring to solve this problem, I have discovered that the difficulties encountered in machining on steel are caused by any one or all of several factors among which are: the harder and tougher character of steel; the repeated pounding of the work with the sharp leading edge of the cutter; the fact that the sharp edge of the cutter gets under a layer of steel and lifts it up and off, i. e., tears it away; and the fact that the so-called built-up edge that soon develops on the cutting edge tends quickly to blunt that edge. These are some of the factors which tend to crack and break off the carbide cutting edges and in a very short time the cutter is rendered useless.

I have found that if the carbide cutter could be made to engage the work first at a point or region inward from the extreme outer cutting edge and then have the zone of engagement progress, outwardly to the cutting edge, the shock of the initial engagement would be received by the more ably supported and backed up body of the cutter instead of at its ground edge. In this way the initial impact would be absorbed by substantial midsections of the blade or cutter prior to the time the sharp cutting edge came into cutting relation with the work surface.

To the same end, if the actual cutting could be made to start somewhere along the cutting blade at a distance back from the outer corner of the cutter, still further gains would be made by so having the cutting load build up initially at a region close to the base or supporting body of the cutter and gradually progress outward along the cutting edge to the outer end. This would locate the starting load at a more firmly supported section, which load would immediately drop to a more or less constant value and remain so by and at the time it had passed along the cutting edge to the outer and less well supported corner of the blade or cutter.

The present invention further undertakes to devise a way of cutting steel that does not result in a "tearing" or lifting up of the chip, and which includes the step of drawing a cutting edge across a surface in a way that the cutting edge itself effects a definite shearing of the chip away from the mass accompanied by a part drawing action of the cutting edge laterally and upwardly through the layer.

Closely related or coordinated with this step of moving the cutting edge with a combined shear and draw type of motion relative to the work is the further objective of maintaining the chip engaging face of the cutting blade in a relation such that the forces reacting thereagainst proceed in a line or direction that passes into and through the main body of the cutting blade, and not transversely across the thinner sections adjacent the ground edge. The maintaining of the relationship herein proposed has the effect of pressing the workpiece downwardly (if the cutter axis is parallel to the plane) or away from the cutter and its cutting edge if the cutter axis is perpendicular to the plane. That is, this invention involves a principle diametrically opposed to the customary practice wherein the cutting edge hooks under a layer of material, as a wedge, and with a forward and upward motion, lift or tear off a clip. In the standard or conventional practice, the pressures and forces of the work reacting against the cutter are transversely through the feathered edge of the cutter and such outwardly acting forces tend to break the cutting edge off just back from its point.

With the present method of cutting, a new relationship or cutter, cutter movement, and work feed, is involved and whereby the pressure of the cutter on the work is down and the reacting force is up, through the body of the cutter. And by maintaining this relationship during the passing of the cutter through the work with a combined shear and draw character of movement above mentioned, the flow of the chip or stock being removed shows a tendency to wipe off the cutting face and keep it clean. Thus, any particles of steel that would tend to adhere to the cutting edge and build up a false and blunted edge, are removed as fast as they accumulate.

A further aim of this invention is to devise a way of machining steel surfaces in a manner whereby the carbide cutting edge may be amply backed up and supported. To attain such support directly behind the edge and in the line of the reactionary pressures, the angles between the plane of the face of the carbide insert and its end and peripheral edges must be relatively blunt or obtuse. Such obtuseness is readily attained with the present method by virtue of the two-way forward slant of the blade with relation to the plane of the surface being operated upon.

Having regard first to the outer end or face end of a cutting blade, and starting with a rectangular section of blade stock, the helical forward slant thereof (in an axial direction) automatically lifts the heel of the end edge away from the plane or surface by an equivalent amount. Thus, if the helix angle is 10 degrees, the clearance behind the end cutting edge will also be 10 degrees, without removing any blade stock from behind the cutting edge. The included angle between the front face of the blade and the end surface remains 90° and little or no grinding is necessary to provide relief or additional clearance. As a consequence, practically the entire thickness of the blade is squarely behind the cutting edge.

A like result obtains with respect to the peripheral edge of the cutter. In this case the plane of the front face is forwardly slanted (in a radial direction) and the longitudinal edge behind the front cutting edge drops inwards by an angular amount equal to the angle of the forward slant. In the case of a cutter, for example, 6 inches in diameter, a 10° forward slant of the blade provides in most cases adequate clearance, but where the blade is relatively thick some grinding may be necessary if the radius of turning is proportionately small.

My copending application Serial No. 442,059 discloses and more particularly claims the structural relations and features of one form of cutter adapted to carry out the milling process herein set forth and to which reference may be had.

Other objects and advantages will be in part indicated in the following description and in part rendered apparent therefrom in connection with the annexed drawings.

To enable those skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which—

Figure 4:
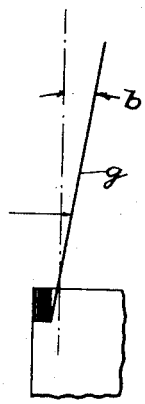
Figure 5:
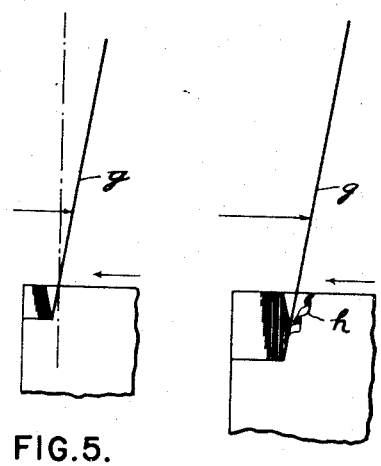
Figure 6:

Figs. 4, 5, and 6, are diagrammatic representations of peripheral cutting edges in different stages of cutting.

Figure 7:
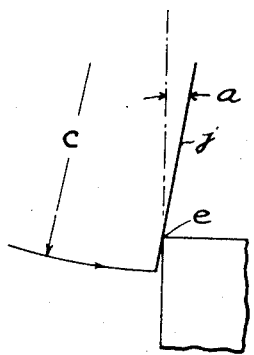
Figure 8:
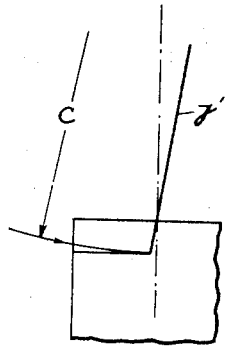
Figure 9:
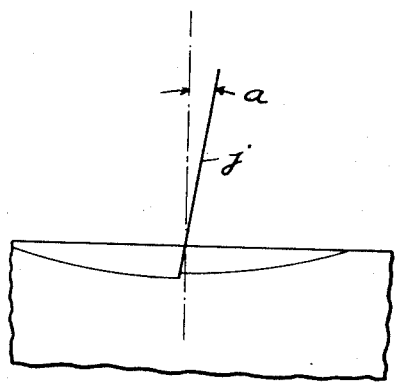

Figs. 7, 8, and 9, are diagrammatic representations of the end or face cutting edges in different cutting relations. In all these views the blade blocks and cutting edges shown are to be regarded as the carbide insert of a larger blade or block, or, as a carbide tipped blade itself.

Figs. 10 and 11 illustrate side and face views respectively of one form of cutter adapted to carry out the method.

Figs. 12 and 13 are fragmentary views, partly in section, of a cutting blade illustrating its relation to the supporting body.

Fig. 14 is a face view of a cutting blade, and

Fig. 15 is a diagrammatic view of an end cutting edge in the process of making a cut.

The present method may be more clearly perceived by regarding the carbide tipped blade 10 as a wide faced board or straight edge placed diagonally across the surface, angle $b$ (Figs. 3–6) and edgeways to the surface. Then, after slanting the board forward, angle $a$ (Figs. 1, 7–9) in the direction it is going to be moved, revolve the board about a center indicated by the radius line $c$. With regard to both end and side edges, the layer to be removed is, in effect, trapped in the angular pocket $d$ and $d'$ formed by the over-leaning face of the straight edge. The chip from the layer that is to be removed, starts forming at the near corner $e$ of the surface and rolls on itself outward along the diagonally disposed and forward leaning surface of the straight edge until it reaches the trailing free end $f$ of the blade. The extreme point $f$ may be beveled off a slight amount where the work does not require a sharp corner to be produced.

In a short time, the peripheral cutting edge $g$ of the blade, due to its angular motion about a center, rolls out of the workpiece. In order to machine an area of surface, I purpose to bring a number of forwardly slanting shaving edges into operating relation with the work surface, in quick succession. Each cutting blade leans forward over the work and is transversely inclined with respect to the direction of cutter movement as above explained, so that the outer and free end of the cutting edge of each blade trails the portions between said outer end and the supporting body.

Figure 1:
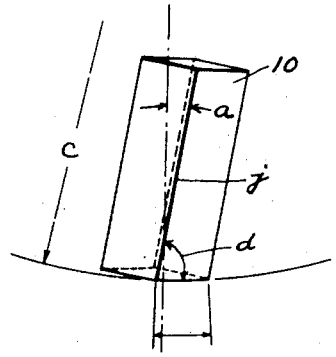
Figure 1 is a view of a cutting blade looking at its end in an axial direction.
Figure 2:
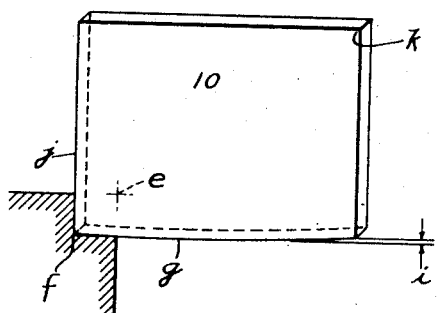
Fig. 2 is a side or face view of the blade.
Figure 3:
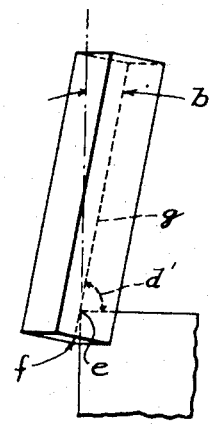
Fig. 3 is a plan view thereof.

Thus, it will be seen that if the cutting edges $g$ were formed upon the periphery of a cylinder, each would extend generally axially and partly around the surface, as a helix. At the same time the work engaging face of each carbide tipped blade is slanted forward, in overlying relation with and at the region of contact with, the work surface and forms a pocket-like cavity within which the chip $h$ rolls on itself as it progresses outwardly along the edge. It will be seen further, that due to the helical curving of the cutting edge about the cylinder, that cutting edge does not lie in a diametral plane, but lies in a helical plane, as indicated at $i$ (Fig. 2), nor does the cutting edge $j$ at the end or face end of the cutter lie in a given radial plane of the cylinder, but it passes through such plane in a direction ahead of the axis of rotation. And while all points along the helical cutting edge are equidistant from the axis of the cylinder, the direction of the helix is such as to position the outer or face end $f$ of the cutting edge circumferentially behind other points along the cylinder axially inward from the said end.

When such a cutter is rotated, that portion of the helix toward the shank end of the cutter engages the work surface first (at $e$) and ahead of all portions outward therefrom, and the outer peripheral end $f$ of the helical cutter engages the workpiece last.

In the practicing of this method, the first impact of the cutter with the work is received inwardly from the face end of the blade (because of its diagonal or helical relation with respect to its direction of movement) and some distance inwardly from the peripheral cutting edge (because of the leaning forward over-the-work relation). The cross e (Fig. 2) represents the point of initial contact. In consequence of this compoundly forward slant, the first blow is at a zone of the cutting blade close to its support, i. e., diagonally inward from the outer peripheral end or corner f and after the engagement, the pressure steadies or becomes constant and progresses radially outward along the end cutting edge j and forward along the peripheral cutting edge g to the outer end thereof, the outermost corner f engaging the work last. The shaving off of the workpiece with this method, is caused to start at the near side and corner of the work and progresses across the work to the free end of the cutter. In the absence of a relative tangential feed movement between the work and helical peripheral cutting edge (Fig. 4), the channel formed thereby across the work is a concave section of a cylinder whose axis parallels the cutter axis.

However, when the rotating cutter or work is moved relative to one another, the cylindrical channel shaved by the peripheral edge of any one blade will extend diagonally across the work by virtue of such relative feed movement, as represented in Fig. 5. By varying the rate of feed, the transverse angle of the cut may be increased or decreased but in all cases it will be opposite to the advancing helix angle b of the cutting edge, and the two angles together constitute the shaving angle of the cutter with relation to the direction of motion between it and the work at any given zone or portion of the cutting edge.

Where the peripheral cutting edge g on the cylinder extends all the way across the workpiece, the outer end j of the cutter is not called upon to perform any cutting action. But where the outer end of the cutter is short of the whole width of the piece, or in facing operations, the end edges j of the cutting blades dress a surface in a plane lying at right angles to the axis of rotation of the cutter. In facing off a block of steel the end edges of the cutter is called upon to do most if not all of the metal removing. With respect to such end cutting edges, each edge j extends generally radially but nonetheless at an advancing angle a to the radial plane. That is, starting at the periphery, the end edge extends inwardly in a direction that intersects a perpendicular diametral plane at a point appreciably ahead of the axial center. As viewed from the end (Figs. 1, 7–9) each cutting edge leans forward ahead of the axis of rotation, and each point along that edge (proceeding from the outer extremity inwards) is circumferentially ahead of points nearer the periphery. In other words, the outer portion of the cutting edge is circumferentially behind and trails portions more inwardly located.

This leaning forward of the blade causes the blade to overlie the workpiece and the chips or shaving, in both directions—radially and axially—and gives the cutter a compoundly slanted position relative to the axis of the cylinder and to the plane of the surface being machined. With respect to the plane of the front face of the blade, the innermost corner k thereof is circumferentially advanced relative to the diagonally opposite and outermost corner f. This last named corner is made by the intersection of the end and peripheral cutting edges j and g and ordinarily is the weakest and less ably supported region of the blade.

With the present method of shaving steel, the outer point or corner f of the blade is the last part thereof to engage the work, for in both peripheral and end cutting operations, the work is engaged by the cutter face first at a point well inward from the peripheral and end edges. The more delicate cutting edges themselves engage the work progressively later and start from points radially and axially inward from the outer corner. As a direct consequence of this method of shaving steel, the delicate cutting edges of the blade are not only relieved of the shock incident to striking the workpiece but also relieved of the duty of withstanding the greater forces generated at the instant of initial contact. In the present method of shaving steel the blow is initially taken some distance inward from the end and by the time the cutting edges engage the work the magnitude of the forces have dropped to a more or less constant value.

In addition to the new location of the initial point of contact made by the cutting blade with this method, the advancing incline of the blade in two directions, causes a cutting pressure on the work in a slightly downward direction, and a reacting pressure on the blade in a slightly upward direction, the line of reaction of the latter passing well into the blade and thence to the supporting body instead of outwardly across the thin section of the blade edges.

The cutting action occurring along the face end of the cutter is produced by a succession of edges each of which slants forward tangentially ahead of the axis (Figs. 1, 7–9) in such a manner that the chip starts forming some distance inwardly from the periphery and rolls or slides outwardly along those edges. This being contrary to the conventional type of cutter wherewith the chips start at the outer end and are pulled inwardly toward the axis.

With the present method of machining steel the chips are in effect pushed away from the cutter, both radially and axially, and show considerably less tendency to build up so-called "built-up-edges" or to collect and clog in the space between blades. In facing operations, the pushing of the chips radially outward by reason of the forward slant of the end edge, prevents the chips from working under more inwardly located portions of the end edges and scoring and marring the finished surface. Especially on steel, the forward slant and forward incline of the end cutting edges, not only throws the chips radially outward, but produces a finish thereon that approaches mirror quality.

It has been found in practicing this method of machining steel that the speed rate and feed rate may be greatly increased. For example, with the ordinary high speed steel cutter, 6 inches in diameter, the R. P. M. thereof and rate of feed may be 40 and 2½ inches per minute, respectively. With the new method of cutting explained herein, not only may carbide tips be used, but that the cutter (6 inch) may be driven at 247 R. P. M. against a feed of 5⅛ inches per minute, which represents a gain of over 100% in the rate of production. Furthermore, and notwithstanding this great increase in speed and in quantity of stock removed per unit of time, carbide cutters embodying this principle of shaving do not heat up, in fact, the cutting edges are cold to the hand after a long period of operation.

Figs. 10–15 illustrate structurally and diagrammatically one form of cutter adapted to carry out this method. In these figures the direction of blade motion and the tangential and helical angles are opposite those represented in Figs. 1–9. The tipped blades 10a are tapered (see Fig. 10) and driven into correspondingly tapered slots 11 formed in the body or support 12. The front wall of each slot extends in a direction tangent to the cutter axis and lies generally ahead thereof, as well as extending longitudinally, at an angle to the axis, as a helix, with the helix progressing opposite to the hand of the cutter. That is, if the cutter is to turn right hand, the blade slots and blades will be set to a left hand helix. The back wall of the slots are tapered relative to the front walls and serrated in conformity with the taper and serrations on the blades. A cutter of this type is explained more fully in my aforesaid copending application.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims.

Having thus revealed this invention, I claim as new and desire to secure the following combinations and elements, or equivalents thereof, by Letters Patent of the United States:

1. The method of face milling steel workpieces which comprises rotating a carbide tipped cutting blade about an axis substantially perpendicular to the plane of the surface to be machined and simultaneously maintaining the general plane of said blade forwardly slanted at an advancing angle relative to the axis of turning and to a plane radial thereof so that the chip engaging front face of the blade in an axial direction leans forward over the chip and also in a radial direction slants circumferentially rearwardly from a point ahead of the axis of rotation so that the outer corner formed by the intersection of the peripheral and end cutting edges of the blade is circumferentially behind other portions of said blade whereby said outer corner is brought into engagement with the workpiece last in order of time with respect to the time of engagement of other points along said edges more inwardly located both radially and axially, and moving said compoundly inclined rotating blade bodily laterally into the steel workpiece to effect the removal of a layer of stock therefrom.

2. The method of face milling steel workpieces which comprises rotating a carbide tipped cutting blade about an axis substantially perpendicular to the plane of the surface to be machined and simultaneously maintaining the general plane of the blade slanted relative to a radial plane from a position ahead of the radial plane at its base to a position behind the radial plane at its periphery whereby the end cutting edge thereof is caused to extend somewhat radially but at an angle such that the peripheral end of said cutting edge is circumferentially behind other and more inwardly located portions, and moving said rearwardly slanted rotating edge laterally relative to the workpiece to effect the cutting operation by a combined shear and draw motion accompanied by movement of the chip radially outwardly along the rearwardly slanting cutting edge.

3. The method of milling steel workpieces which consists in positioning a cutting blade relative to the plane of the work surface at a compound advancing angle such that the outer corner formed by the intersection of the end and peripheral cutting edges thereof is circumferentially behind other portions of the blade both radially and axially whereby all other points along said radial and axial cutting edges are circumferentially advanced ahead of said outer corner, rotating said cutting blade in a circle at a relatively fast rate of speed, and feeding said fast rotating and compoundly forwardly slanted blade bodily laterally relative to the workpiece to effect the metal removing operation.

4. A method of machining a mirrow-like surface on a steel workpiece with the removal of a layer of stock from the surface thereof which comprises rotating a cutter at a relatively fast rate of speed and bringing it into working relation with the workpiece, said cutter having a carbide tipped blade therein whose plane lies at an angle relative to the axis of rotation and relative to a plane radial thereto such that with respect to the direction of rotation of the blade the chip engaging front face thereof leans forward and overlies the chip in both directions radially and axially and thereby positioning the cutting edges at the extreme outer corner of the blade circumferentially behind other and more inwardly removed portions of the cutting edges.

ERNEST REANEY.